United States Patent [19]
Juang et al.

[11] Patent Number: 5,710,864
[45] Date of Patent: Jan. 20, 1998

[54] SYSTEMS, METHODS AND ARTICLES OF MANUFACTURE FOR IMPROVING RECOGNITION CONFIDENCE IN HYPOTHESIZED KEYWORDS

[75] Inventors: Biing-Hwang Juang, Warren; Chin-Hui Lee, New Providence; Richard Cameron Rose, Watchung, all of N.J.

[73] Assignee: Lucent Technologies Inc., Murray Hill, N.J.

[21] Appl. No.: 366,162

[22] Filed: Dec. 29, 1994

[51] Int. Cl.$^6$ .................................................. G10L 5/06
[52] U.S. Cl. ...................... 395/2.47; 395/2.6; 395/2.65; 395/2.64; 395/2.4
[58] Field of Search .................... 395/2.6–2.66, 395/2.5, 2.47

[56] References Cited

U.S. PATENT DOCUMENTS

| | | | |
|---|---|---|---|
| 4,827,521 | 5/1989 | Bahl et al. | 381/43 |
| 5,428,707 | 6/1995 | Gould et al. | 395/2.4 |
| 5,440,662 | 8/1995 | Sukkar | 395/2.45 |
| 5,509,104 | 4/1996 | Lee et al. | 395/2.65 |
| 5,579,436 | 11/1996 | Chou et al. | 395/2.53 |

OTHER PUBLICATIONS

Chen et al., "An N-Best Candidates Based on Discriminative Training for Speech Recognition Applications," IEEE Transactions on Speech and Audio Processing, vol. 2, No. 1, part II, Jan. 1994, pp. 206–216.

Rose, R.C., "Discriminant Wordspotting Techniques for Rejecting Non-Vocabulary Utterances in Unconstrained Speech," Proc. IEEE International Conference on Accousitics, Speech and Signal Processing, San Francisco, Mar. 1992, pp. 105–108.

*Primary Examiner*—Allen R. MacDonald
*Assistant Examiner*—Alphonso A. Collins

[57] ABSTRACT

Systems, methods and articles of manufacture are provided for adjusting the parameters of ones of a plurality of recognition models. The recognition models collectively represent a vocabulary. The recognition models are utilized to identify a known word represented within a received input signal. The received input signal may include within vocabulary and out of vocabulary words. An output signal representing a confidence measure corresponding to the relative accuracy of the identity of the known word is generated. Particular ones of the plurality of recognition models are adjusted as a function of the output signal to improve the confidence measure. The systems, methods and articles of manufacture are preferably implemented in accordance with discriminative techniques, and the adjustment process is used during either a preferred training or a recognition mode.

30 Claims, 6 Drawing Sheets

SYSTEMS, METHODS AND ARTICLES OF MANUFACTURE FOR IMPROVING RECOGNITION CONFIDENCE IN HYPOTHESIZED KEYWORDS

TECHNICAL FIELD OF THE INVENTION

The present invention relates generally to speech recognition and understanding, and more particularly to systems, methods and articles of manufacture for improving recognition confidence in keywords hypothesized during continuous speech recognition.

BACKGROUND

Speech recognition is a process by which one or more unknown speech utterances are identified. Speech recognition is generally performed by comparing the features of an unknown utterance with the features of known words. Known words as used herein include, without limitation, words, phrases, lexical units and/or strings. The unknown speech utterance is typically represented by one or more digital pulse code modulated ("PCM") signals. The features, or characteristics, of the known words are typically defined through a process known as training.

Through training, samples of known words are examined and their features are recorded as recognition models in a recognition database. Each recognition model is essentially a reference pattern which represents a single known word. Each known word includes one or more phones. A phone as used herein is defined as the acoustic manifestation of one or more linguistically-based phonemes or phoneme-like items.

Speech recognizers typically extract features from the unknown utterance to characterize it. There are many types of speech recognizers, such as, for example, conventional template-based and Hidden Markov Model ("HMM") recognizers, as well as recognizers utilizing recognition models based on neural networks.

The particular features associated with the unknown utterance are often referred to as a test pattern. The recognizer compares one or more recognition models, or combinations thereof, to the test pattern. A scoring technique is used to provide a relative measure of how well various recognition model combinations match the test pattern. The unknown utterance is recognized by the known words associated with the recognition models with which the test pattern most closely matches.

Conventional recognizers often have difficulty verifying the occurrence of keywords in an unknown speech utterance. Typical automated inbound telephone applications, for example, route incoming calls to particular employees by recognizing a caller's utterance of an employee's name and associating that utterance with the employee's extension. Callers often pronounce names that are not in the directory, or worse, vocalize utterances that are phonetically similar to a different employee's name, causing the caller to be routed to the wrong party.

In other instances, callers embed keywords within an otherwise undefined utterance. For example, when prompted for an employee's name, the caller may state, "Well, I don't know. I think his name is John something. John Smith. That's right, Mr. Smith." It is not uncommon for a speech recognizer to be unable to recognize the keywords, "John" and "Smith", or worse, to incorrectly identify, or hypothesize, some other name.

These problems exist for a number of reasons. In particular, most recognition systems have a limited vocabulary of known words. A vocabulary as used herein is a list, set or group of defined known words, including, sub-words and symbols, used in a language. A particular vocabulary of known words may include both keywords and phonetically similar alternate words. Spoken utterances including undefined words confuse the system as it is unable to recognize the known words from the balance of the utterance.

Further, recognition model parameters are estimated from static training data stored during an initial training mode. The model parameters are produced separate and apart from their intended use during a recognition mode. The model parameters, once generated, cannot always be adjusted or tuned to improve their recognition accuracy. Because the values of the model parameters are typically static estimates, or approximations, their modeling assumptions, if not keenly accurate, significantly degrade the power of the recognition system.

Discriminative techniques, which disambiguate true keyword hits from phonetically similar word or words, have been proposed. Discriminative recognition processes utilize a combination of recognition models. One recognition model set or group represents defined keywords and another recognition model set represents phonetically similar word or words of the defined keywords. The two sets of scores produced by the two recognition model sets are analyzed to determine if a keyword is present.

SUMMARY OF THE INVENTION

In accordance with the principles of the present invention, systems, methods and articles of manufacture are presented for adjusting recognition models to improve recognition confidence in hypothesized keywords.

In particular, recognition confidence may be improved during either one of the training or the recognition modes. An important aspect of the invention is a preferred supervisory training mode wherein known training samples are submitted to the recognition system to improve recognition confidence and accuracy. Another aspect of the invention is a preferred recognition mode which improves recognition confidence through information derived automatically from the unknown utterance, or alternatively, through a confirmation strategy.

A speech recognition system in accordance with the principles of the present invention preferably includes receiving, storing and processing means. The receiving means operates to receive an input signal representing a speech utterance. The storing means operates to store a plurality of recognition models. Each one of the recognition models preferably represents a known word within a vocabulary. In one embodiment, discriminative techniques are utilized wherein the known words include both keywords and phonetically similar alternatives. The processing means, which preferably includes at least one processing unit, operates to process the input signal utilizing certain ones of the plurality of recognition models to identify one or more words represented within the input signal. The processing means generates an output signal representing a confidence measure corresponding to the relative accuracy of the performed identification process. The processing means preferably adjusts particular ones of the recognition models as a function of the generated output signal to improve the confidence measure.

A method for improving the accuracy of a speech recognition system in accordance with the principles of the present invention concerns the utilization of a plurality of recognition models to identify a known word within a received input signal. Each one of the recognition models preferably represents a particular known word within a vocabulary, while the received input signal represents a speech utterance. The preferred method identifies the known word utilizing one or more of the plurality of recognition models, and generates an output signal representing a confidence measure corresponding to the relative accuracy of the identification step. The confidence measure is improved by adjusting particular ones of the plurality of recognition models as a function of the generated output signal. This method may be suitably adapted to incorporate discriminative techniques.

One embodiment for using and/or distributing the present invention is as software stored to a storage medium. The software embodiment includes a plurality of processing system instructions for controlling at least one processing unit for performing speech recognition in accordance with the present invention. More particularly, the processing system instructions cause the processing system to generate, during either training or recognition mode, an output signal or data set representative of a confidence measure. The confidence measure corresponds to the relative accuracy of an identification process. The output data set is utilized to adjust the identification process to improve the confidence measure. The storage mediums utilized to implement the software embodiment include, without limitation, magnetic, optical, or semiconductor chip mediums, as well as suitably arranged combinations thereof.

BRIEF DESCRIPTION OF THE DRAWINGS

For a more complete understanding of the present invention, and the advantages thereof, reference is made to the following descriptions taken in conjunction with the accompanying drawings in which like numbers designate like parts, and in which.

DETAILED DESCRIPTION OF THE DRAWINGS

Figure 1A:
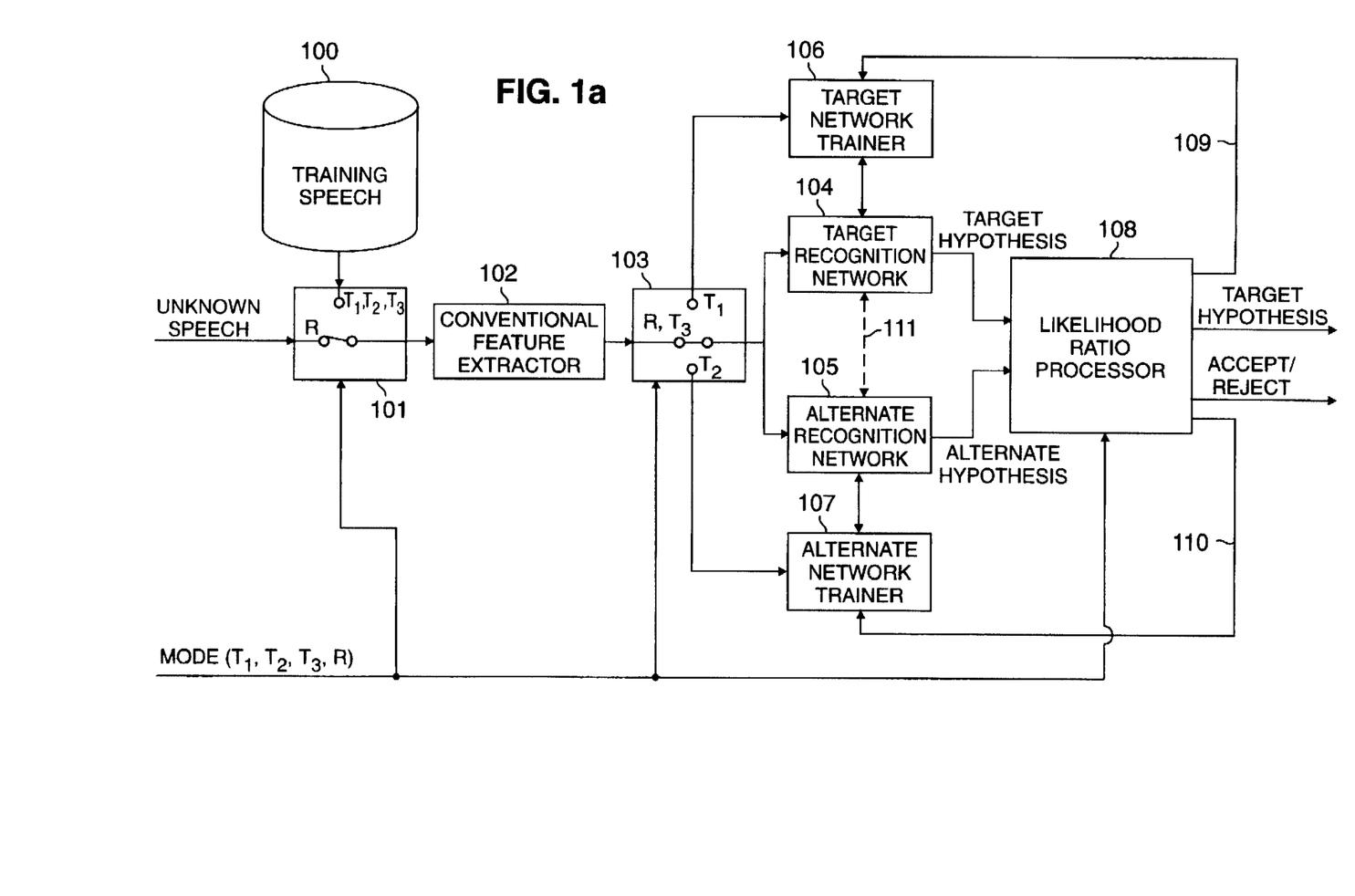
FIG. 1a illustrates a block diagram of one continuous speech recognizer in accordance with the principles of the present invention.

FIG. 1a illustrates a block diagram of one continuous speech recognizer in accordance with the principles of the present invention. This embodiment is preferably processing system based, wherein the principles of the present invention are implemented in software, as previously introduced. The software is preferably compiled and stored to a suitable conventional storage medium, either internal or external to the processing system. Alternate preferred embodiments may also be implemented in hardware or firmware, as well.

The illustrated system operates on real physical speech input signals, preferably PCM signals, in both a training and a recognition mode to provide real physical output signals. The illustrated system preferably provides both recognized speech signals and an accept/reject data signal, also preferably in digital form, as first and second outputs, respectively.

The illustrated embodiment utilizes a preferred discriminative likelihood ratio processor, as will be discussed in detail momentarily, to perform a preferred likelihood ratio test. The preferred ratio processor both produces the accept/reject data output signal, and operates to adjust the parameters of certain associated recognition models to improve recognition confidence in accordance with the principles of the present invention. The adjustment of the recognition models may be accomplished during either a preferred training or a recognition mode.

The training mode as defined herein is the process of developing a training database of recognition models, and may include one or more initial training states, as will be discussed with reference to FIG. 1a, and further includes a preferred gradient descent based training state, as will be discussed in detail with reference to FIG. 1b. Training databases are typically application dependent, in other words, the recognition models are constrained within a defined domain.

The recognition mode as defined herein is the process of recognizing or rejecting unknown speech utterances through the utilization of one or more recognition models developed during the training mode. The preferred gradient descent based training procedure utilized during the preferred training mode may be implemented so as to remain active during the recognition mode to monitor and to adjust selectively target and/or alternate model parameters in accordance with the present invention.

It should be noted that the preferred ratio processor may be adapted to, and implemented in conjunction with, any suitable speech recognizer, including, without limitation, template based dynamic time warping systems and neural network based systems, to name two examples.

The illustrative system in FIG. 1a includes a training speech database 100, a conventional feature extractor 102, a plurality of mode switches 101 and 103, a target recognition network 104, an alternate recognition network 105, a target network trainer 106, an alternate network trainer 107, a likelihood ratio processor 108 and a plurality of update gradient loops 109 and 110. In one preferred embodiment, a communications bus 111 couples the target and alternate recognition networks 104 and 105, respectively. Communications bus 111 may be either single or bi-directional.

The training speech database 100 preferably includes samples of known speech signals in digital form. These samples are used during an exemplary three-state training mode, by the target and alternate network trainers 106 and 107, respectively, and the likelihood ratio processor 108. The ratio processor 108 is operable in conjunction with the balance of the recognition network and network trainers 104–107.

Inclusion of both the target and alternate network trainers 106 and 107, respectively, is for illustrative purposes only, as the illustrated trainers may be replaced by any single suitably arranged trainer, or plurality thereof, in accordance with the principles of the present invention. In alternate embodiments, either one or both network trainers 106 and 107 may be preprogrammed with a vocabulary having preset recognition model parameters. In such embodiments, initial training states may be skipped, or bypassed, and the preset parameters adjusted during the preferred training and/or recognition modes by likelihood ratio processor 108.

Samples of known speech from database 100 are provided to other components of the system via mode switch 101. Mode switch 101 reflects the two operational modes of the illustrative system, namely, a training mode ("T") and a recognition mode ("R"). The training mode includes three illustrative training states ("$T_1$,$T_2$,$T_3$"). The first training state ("$T_1$") trains the target network trainer 106. The second training state ("$T_2$") trains the alternate network trainer 107. The third training state ("$T_3$") utilizes a preferred gradient descent based training procedure. The gradient descent based training procedure adjusts recognition model parameters which were set during the first and/or second training states, or alternatively, as a result of pre-programming. The preferred gradient descent based training procedure is more fully discussed with reference to FIG. 1b.

When mode switch 101 is in the $T_1$,$T_2$,$T_3$ position, or training mode, known training speech from database 100 is provided to the balance of the system such that word hypothesis training may be performed. When mode switch 101 is in the R position, unknown speech utterances are provided to the balance of the system for recognition and accept/reject designation by the target and alternate recognition networks 104 and 105, respectively, and likelihood ratio processor 108.

Conventional feature extractor 102 is coupled to mode switch 101. Depending on the position of mode switch 101, conventional feature extractor 102 will receive either training or unknown speech signals. Extractor 102 produces one or more observation or feature vectors, X={$\vec{x}_1$, . . . , $\vec{x}_T$}. The feature vectors characterize the received speech input signals. Feature extractor 102 is preferably of the conventional cepstral feature vector type, however, any suitably arranged conventional feature extractor may be utilized in conjunction with or in place of the foregoing, including, without limitation, a filter bank, a linear predictive coding, or a discrete Fourier transform feature extractor, to name three other examples. The feature vectors produced by feature extractor 102 are provided to mode switch 103.

Mode switch 103 is illustrated as having three states, and as operating substantially in tandem with mode switch 101. In other words, both switches are set to any one of the three training states ($T_1$, $T_2$ or $T_3$) of the training mode or to the recognition mode (R), at the same time. The switching process is controlled by a mode signal provided to both switches 101 and 103 and to likelihood ratio processor 108 by a suitable conventional control means (not shown). Mode switch 103 directs the feature extractor 102 output to either target network trainer 106 ($T_1$), alternate network trainer 107 ($T_2$), or to alternate and target recognition networks 104 and 105 ($T_3$ or R), respectively. The mode signal provided to likelihood ratio processor 108 indicates whether the word hypotheses received by processor 108 from the target and/or alternate recognition networks 104 and 105 were produced as a result of the third training mode or the recognition mode.

The network trainers 106 and 107 preferably include the capability for both conventional maximum likelihood HMM based training, and for discriminative training procedures, as will be discussed herein. HMM based trainers and recognizers are known. HMM based trainers and recognizers use both first and second order statistics such as spectral means and variances of known speech samples. Each recognition model is generally an N-state model which reflects these statistics. Each HMM state corresponds to the statistics associated with the temporal events of a known word. HMMs are accordingly characterized by state transition matrices which provide a statistical description of how new states may be reached from old states, and observation probability matrices which provide descriptions of which spectral features are likely to be observed in a given state. During recognition, test pattern scoring typically reflects the probability of the occurrence of the test pattern feature sequence with respect to a particular recognition model.

Each one of the target and alternate network trainers 106 and 107, respectively, preferably produces a set of one or more conventionally trained HMMs, $\Lambda_C$ and $\Lambda_I$, respectively. For the purposes of the illustrative embodiment, the degree of training provided to the conventional trainers, or the type of conventional trainers utilized, remains unimportant. The output of each one of the trainers 106 and 107, $\Lambda_C$ and $\Lambda_I$, respectively, is preferably recorded to one or more conventional data storage devices. The storage devices may be located internal or external to either one, or both, of trainers 106 and 107.

The illustrated embodiment utilizes discriminative recognition techniques. The target network trainer 106 is preferably trained or preprogrammed to recognize a particular vocabulary. Each known keyword, W, within the vocabulary may be expanded according to a set of phonetic base forms. The word "CARD", for example, may be expanded using models of statistical HMM parameters for the phones "K", "AA", "R", and "D". The alternate network trainer 107 is preferably trained or preprogrammed to recognize one or more alternate known word, sub-word or symbol patterns corresponding to one or more words which are phonetically similar to a particular one of the known keywords, subwords, or symbols of the defined vocabulary of the target network trainer 106.

Each one of the target and alternate recognition networks 104 and 105, respectively, preferably includes one or more scoring comparators and one or more score processors (not shown). The target and alternate recognition networks 104 and 105 cooperatively provide the discriminative recognition system. Each scoring comparator relates trained patterns, preferably HMM models, such as $\Lambda_C$ and $\Lambda_I$, for example, to signals representing known or unknown speech utterances and determines a score indicating the closeness of the comparison. When a sequence of feature vectors representative of a known or unknown utterance is input to the target and alternate networks 104 and 105, respectively, a probabilistic alignment of the utterance with respect to the respective recognition models is obtained. The scoring comparators preferably employ log-likelihood Viterbi scoring. The techniques for performing Viterbi scoring are known.

In one preferred embodiment, the alternate recognition network 105 is operable selectively to generate an alternate hypothesis of particular keyword hypotheses generated by target recognition network 104. The target recognition network 104 preferably directs the alternate recognition network 105, via communications bus 111, to generate an alternate hypothesis when target recognition network 104 hypothesizes a particular defined keyword.

Scores populated by the target and alternate comparators are provided to the one or more target and alternate score processors, respectively. The target and/or alternate score processors determine which of the scores provided by their respective comparators is greatest, and then identify the target and alternate HMMs which are responsible for that score. The score of the identified target HMM is a hypothesis of a word within the defined vocabulary, while the score of the identified alternate HMM is a hypothesis of a phonetically similar word or words corresponding to the identified target HMM. It should be noted that the complexity of the alternate network may range from a very complex recognition model set as described herein, to a simple set of values used for comparison. The unknown speech signal is discriminatively accepted or rejected by the ratio processor 108 as the known speech associated with the respective identified HMMs.

Figure 2:
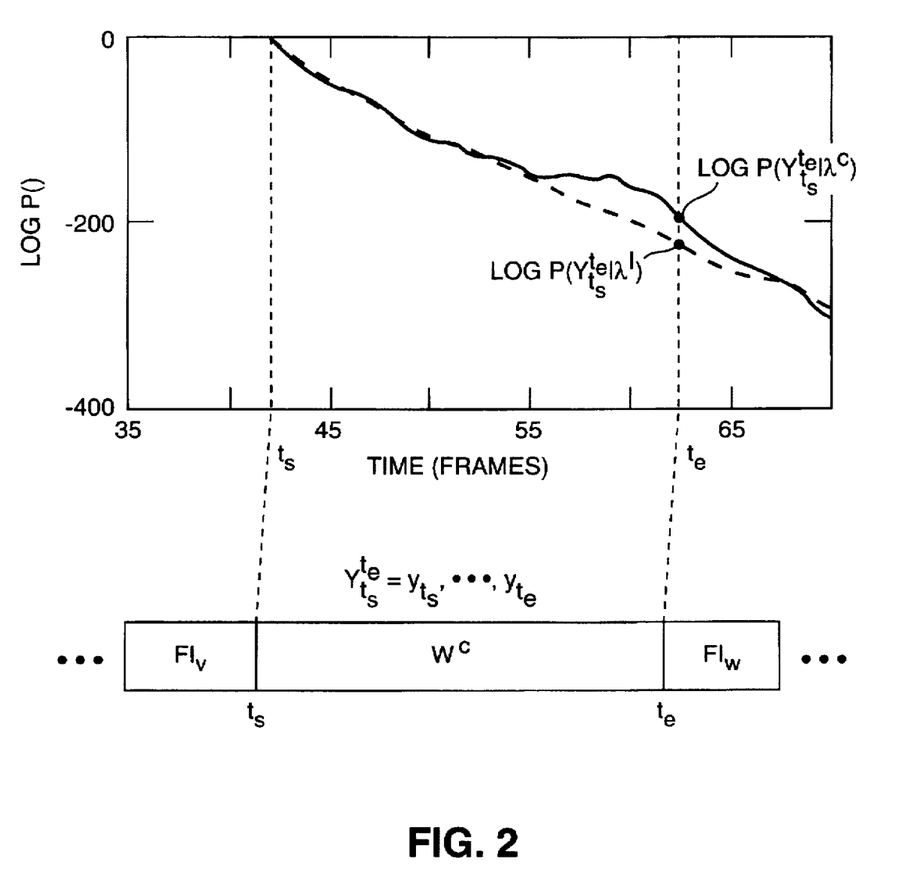
FIG. 2 illustrates an artist's rendition of a log path probability graph of an unknown utterance.

Turning momentarily to FIG. 2, there is illustrated an artist's rendition of a log path probability graph obtained for an unknown utterance, X, which represents the defined vocabulary word "LOOK". $P(Y_{t_s}^{t_e}|W^C)$ is representative of the path probability for a hypothesized vocabulary keyword, and $P(Y_{t_s}^{t_e}|W^I)$ is representative of the path probability of the associated alternate hypothesis. The time labels, $t_S$ and $t_e$, represent the start and end frames for the hypotheses decoded by the target and the alternate recognition networks 104 and 105, respectively.

The Viterbi algorithm is preferably used to obtain the underlying HMM state sequence which is most likely to have generated the observed feature vectors, X, and as a byproduct, provides the boundaries, the end points, $t_S$ and $t_e$, between the decoded occurrences of all lexical items in the string. The target and alternate recognition networks 104 and 105 compute a probability of the designated target and alternate models over the interval $t_S$ to $t_e$, illustrated as $P(Y_{t_s}^{t_e}|\lambda^C)$ and $P(Y_{t_s}^{t_e}|\lambda^I)$, respectively.

A likelihood ratio statistic for testing whether the hypothesized word corresponds to an actual keyword occurrence or an incorrectly decoded keyword, as given the probabilities illustrated in FIG. 2, may be computed and compared to a decision threshold by likelihood ratio processor 108. The ratio processor 108 is preferably operable to accept or reject the hypothesized word occurrence produced by the target recognition network 104.

Returning to FIG. 1a, likelihood ratio processor 108 receives as first and second inputs the hypothesized keyword and alternate hypotheses from target and alternate recognition networks 104 and 105, respectively. Recall that in a preferred embodiment, the alternate recognition network 105 is operable selectively to generate alternate hypotheses of particular keywords. The likelihood ratio processor 108 operates to generate an accept/reject signal. The accept/reject signal verifies the hypothesized keyword of target recognition network 104. The verification utilizes a statistical hypothesis test to determine whether or not a particular sequence of feature vectors were generated by a given family of parametric densities, in other words, the particular set or sets of recognition models. The form of the parametric density, p(Y|λ), is assumed to be known. For example, p() might correspond to a HMM density, and λ might correspond to the set of HMM parameters, for example.

The preferred statistical hypothesis test performed by likelihood ratio processor 108 is given by, $$L(Y, \lambda^C, \lambda^I) = \frac{p(Y|\lambda^C)}{p(Y|\lambda^I)},$$

which verifies the hypothesis that a sequence of observations, X, was generated by the model $\lambda^C$ corresponding to the target hypothesized vocabulary word $W^C$, as opposed to a sequence of hypothesized observations, X, having been generated by a model $\lambda^I$ corresponding to the alternate hypothesis, $W^I$.

Figure 1B:
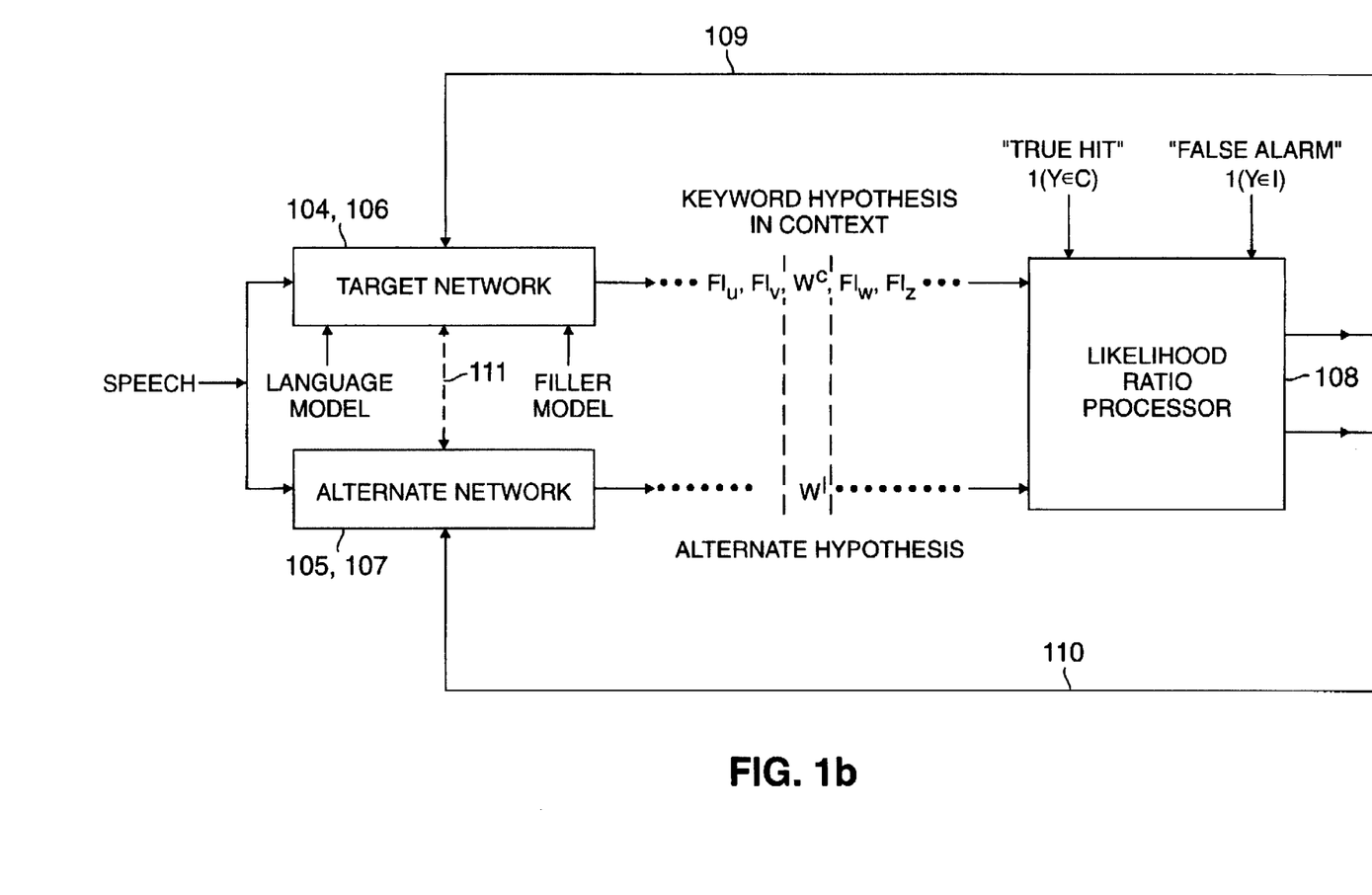
FIG. 1b illustrates a block diagram of a gradient descent based training procedure.

FIG. 1b illustrates a more detailed block diagram of one preferred gradient descent based training procedure operable to improve recognition confidence in hypothesized words identified during continuous speech recognition. The preferred training technique adjusts the parameters $\lambda^C$ and/or $\lambda^I$ of the target and alternate network trainers 106 and 107, respectively, to increase the confidence measure for verifying word hypotheses. The training criterion adjusts the recognition model parameters to minimize the difference between the alternate and target model probabilities based on the logarithm of the inverse of the above statistical test, $$S_c(Y) = \log P(Y|\lambda^I) - \log P(Y|\lambda^C).$$

Keyword hypotheses corresponding to both actual keyword utterances (Y∈C: true hits) and to imposter, or alternate, utterances (Y∈I: incorrectly decoded keywords) are presented to the likelihood ratio processor 108 to decrease the weighted average value of $S_c(Y)$ for actual keyword occurrences (Y∈C) and to increase the weighted average value of $S_c(Y)$ for incorrectly decoded keywords (Y∈I).

The difference, $S_c(Y)$, is preferably approximated by obtaining the sequence of states that are most likely to have generated the decoded observation vectors, X, for that word, W. The Viterbi algorithm is preferably used to obtain the sequence of states for both the correct and imposter hypotheses $\Theta^C = \theta_1^C, \ldots \theta_T^C$ and $\Theta^I = \theta_1^I, \ldots, \theta_T^I$, respectively. The local log probability of an observation vector $\vec{y}_t$ for state $\theta_t$ is given as $\log b_{\theta_t}(\vec{y}_t) = \log p(\vec{y}_t|\theta_t, \lambda)$. A local log likelihood ratio difference may then be defined as, $$d(\vec{y}_t) = \log b_{\theta_t^I}(\vec{y}_t) - \log b_{\theta_t^C}(\vec{y}_t).$$

The word based log likelihood ratio difference, $S_c(Y)$, may be approximated using the local log likelihood ratio as, $$D(Y) = \sum_{t=1}^{T} d(\vec{y}_t).$$

A gradient descent procedure is preferably used to iteratively adjust recognition model parameters as new utterances are presented during the third training state. An error measure corresponding to the error measure used for generalized probabilistic descent is used to provide a suitably behaved model estimation procedure whose estimation error is correlated with word verification performance. A word level error, $$L(Y, \Lambda) = l(\delta(Y, C, I) D(Y)),$$

is used herein, $$l(x) = \frac{1}{1 + \exp - \gamma x}, \text{ and } \delta(Y, C, I) = \begin{cases} 1 & Y \in C \\ -1 & Y \in I \end{cases}.$$

Note that $\Lambda = [\lambda^C, \lambda^I]$ of the word level error represents both the target keyword model and alternate model parameters. The indicator function δ(Y, C, I) above dictates that the average of the local log likelihood ratio be minimized for utterances corresponding to correct hypotheses and maximized for imposter utterances. The observation probabilities, $b_i b_j()$, are defined as mixtures of Gaussians of the form, $$b_i \neq (\vec{y_t}) = \sum_{j=1}^{M} c_{i,j} f_{i,j}(\vec{y_t}),$$

where $C_{ij}$ is the mixture weight for the jth mixture Gaussian and $f_{i,j}(\vec{Y_t})$ are Gaussian densities with diagonal co-variance matrixes.

This implies that the $f_{i,j}(\vec{Y_t})$ are completely defined by their mean $\mu_{i,j}[k]$ and standard deviations $\sigma_{i,j}[k]$ where i=(1, ..., M) and k=(1, ..., K). The total set of parameters to be estimated are hence, $\lambda_C = \{C_{i,j}^C, \mu_{i,j}^C[k], \sigma_{i,j}^C[k]\}$ corresponding to the correct class models, and $\lambda_I = \{C_{i,j}^I, \mu_{i,j}^I[k], \sigma_{i,j}^I[k]\}$ corresponding to the imposter or alternate class models.

For any model parameter $\phi_i$ associated with the state i of either the target or alternate hypothesis model, the gradient $\nabla L(Y,\Lambda)$ of the word level error measure defined above can be written in terms of the partial derivative, $$\frac{\partial L(Y, \Lambda)}{\partial \phi_i} = \frac{\partial L(Y, \Lambda)}{\partial D(Y)} \cdot \frac{\partial D(Y)}{\partial \phi_i} =$$

$$\sum_{t=1}^{T} \gamma l(D(Y)) \left( 1 - l(D(Y)) n(\theta_t^c, \theta_t^I, i, Y) \frac{\partial \log \vec{b_i(y_t)}}{\partial \phi_i} \right),$$

where, $$n(\theta_t^c, \theta_t^I, i, Y) = \begin{cases} 1 \; Y \in C, i = \theta_t^I \\ -1 \; Y \in I, i = \theta_t^C \\ 1 \; Y \in C, i = \theta_t^I \\ -1 \; Y \in I, i = \theta_t^C \end{cases}$$

The indicator function $n(\theta_t^C, \theta_t^I, i, Y)$ above defines the direction of the gradient depending on whether the utterance corresponds to a correctly or incorrectly decoded keyword, and whether $\phi_i$ is a parameter from a correct or alternate hypothesis model. The expressions for the partial derivatives of $\log b_i(\vec{Y_T})$ when $b_i()$ are of the Gaussian form given above, and are described in "Discriminative Learning for Minimum Error Classification," by B. H. Juang and S. Katagiri, in *IEEE Trans. on Signal Proc.*, pp. 3043–3054, December 1992; "Segmental GPD Training of a Hidden Markov Model Based Speech Recognizer," by W. Chou, B. H. Juang, and C. H. Lee, in *Proc. Int. Conf. on Acoust., Speech, and Sig. Processing*, pp. 473–476, April 1992; and "An N-best Candidates Based Discriminative Training for Speech Recognition Applications," by J. K. Chen and F. K. Soong, in *IEEE Trans. on Speech and Audio Proc.*, vol. 2, January 1994, which are collectively incorporated herein by reference.

In summary, the discriminative training procedure is preferably applied by first, generating one or more word hypotheses along with the associated word end points by the target network. Second, decoding the word hypothesis for an utterance labeled as corresponding to an actual occurrence of a vocabulary word (true hit) or an incorrectly decoded keyword. Third, computing D(y) using the probabilities estimated from the target and alternate hypothesis models. Finally, performing the gradient update illustrated in the above training criteria on the expected error $E[L(Y, \Lambda)]$ by likelihood ratio processor 108 via gradient update loops 109 and 110 as, $$\Lambda_{n+1} = \Lambda_n - \epsilon \nabla E[L(Y, \Lambda)],$$

where $\epsilon$ is a learning rate constant and the expectation is computed by summing over all observation vectors, X, in the training set labeled as keyword hypotheses.

It should be noted, as previously indicated, that the update gradient as illustrated herein is not limited in application to the exemplary training procedure presented above. The principles set forth hereinabove are suitable for use during recognition mode to improve recognition confidence in hypothesized keywords. This may be accomplished in a number of ways. More particularly, a confirmation system or procedure may be implemented. Using the automated telephone example previously introduced, assume that the hypothesized keyword is phonetically similar to the name "SMITH". Further assume that confidence that the hypothesis is correct is not high. In other words, the input utterance when analyzed, was sufficiently close to an alternate hypothesis such as "SMYTH" to warrant action. The caller may be prompted to say "YES" if the hypothesis "SMITH" is correct and "NO" if not correct. Depending upon the caller's response, the above discussed gradient update is performed. Either or both the target and alternate model parameters may be adjusted in accordance therewith.

In an alternate recognition embodiment, the scores produced by the recognition networks 104 and 105 of FIG. 1a, for example, are utilized to determine whether the gradient update procedure should be performed. For example, whenever the recognition system is relatively confident that an input utterance includes either a target or an alternate hypothesis, the update procedure is undertaken. In situations where it is unsure, the procedure to adjust either or both the target and alternate recognition models is bypassed, or, alternatively, a suitable confirmation procedure, such as illustrated above, is utilized.

Figure 3:
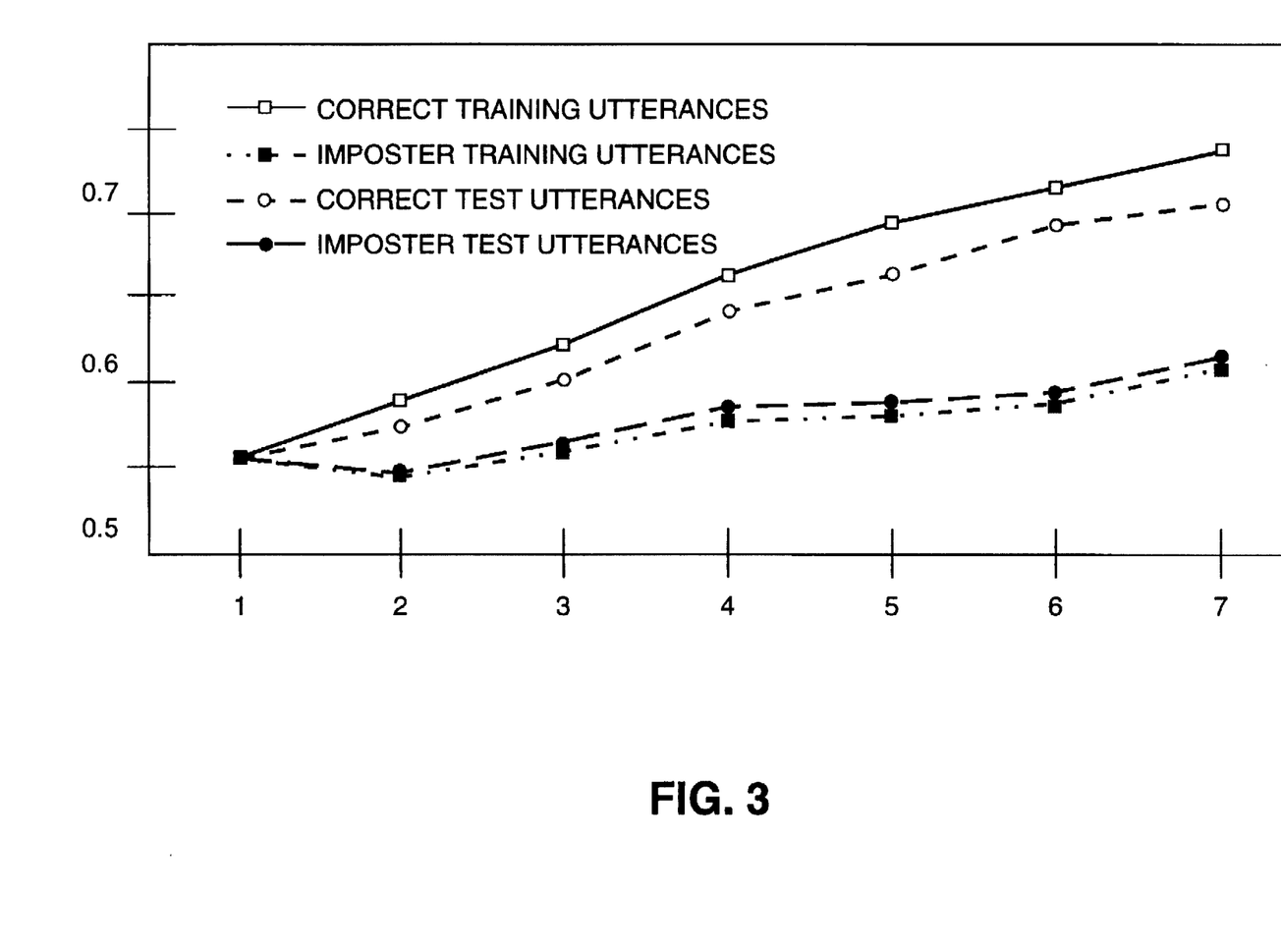
FIG. 3 illustrates an artist's rendition of an average log likelihood ratio score graph of both target and alternate keyword hypotheses.

FIG. 3 illustrates an artist's rendition of an average log likelihood ratio score graph of both target keyword and alternate hypotheses. A function of an average log likelihood ratio difference, where that function is, 1–l(D(Y)), and is computed separately for both true and false hypotheses are illustrated. The plotted curves shown were computed from utterances of the keyword "money". The model parameters are adjusted based on utterances in the training set, and not those utterances in the test set. The solid curves correspond to error computed over the training utterances and the dashed curves represent error computed over test utterances. As is illustrated, the relative separation between correct and imposter hypotheses improves as a result of model adjustment over the training data set. This illustrates but one of the many modes with which the principles of the present invention may be utilized.

Figure 4:
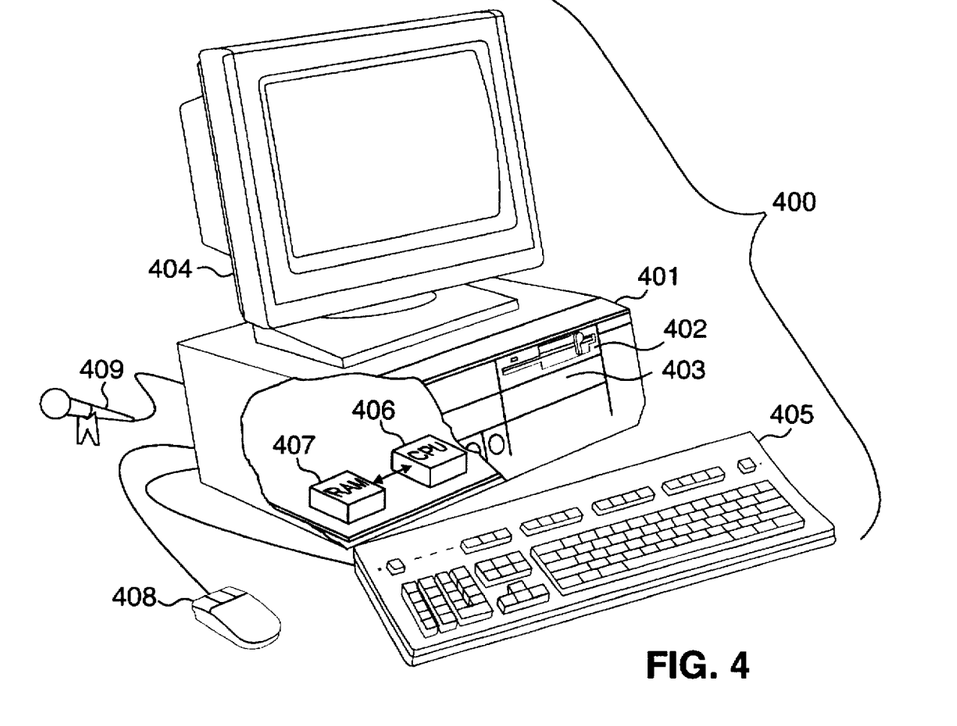
FIG. 4 illustrates an isometric view of an illustrative processing system which may be programmed to perform continuous speech recognition in accordance with the principles of the present invention.

FIG. 4 illustrates an isometric view of an illustrative processing system, a personal computer 400, which may be programmed to perform speech recognition in accordance with the principles of the present invention. As previously introduced, a preferred embodiment for using and/or distributing the present invention is as software. The software preferably includes a plurality of processing system instructions for controlling at least one processing unit for performing speech recognition.

Personal computer 400, which is coupled with a conventional microphone 409, includes a hardware casing 401 (illustrated having a cut-away view), a monitor 404, a keyboard 405 and a mouse 408. The microphone 409, illustrative of a typical speech input receiving device, operates to receive sound waves and to generate representative electric signals, preferably digital PCM signals. The monitor 404, and the keyboard 405, the mouse 408, and the microphone 409 may be replaced by, or combined with, other suitably arranged output and input devices, respectively. For example, microphone 409 may be replaced by, or combined with, other conventional suitably arranged sound receiving devices, such as, videophone and conventional telephony device and service technologies.

Hardware casing 401 includes both a floppy disk drive 402 and a hard disk drive 403. Floppy disk drive 402 is operable to receive, read and write to external disks, while hard disk drive 403 is operable to provide fast access data storage and retrieval. Although only floppy disk drive 402 is illustrated, personal computer 400 may be equipped with any suitably arranged structure for receiving and transmitting data, including, for example, tape and compact disc drives, and serial and parallel data ports. Within the cut away portion of hardware casing 401 is a processing unit 406, coupled with a memory storage device 407, which in the illustrated embodiment is a random access memory ("RAM"). Although personal computer 400 is shown having a single processing unit 406, personal computer 400 may be equipped with a plurality of processing units 406 operable to cooperatively carry out the principles of the present invention. Although personal computer 400 is shown having the single hard disk drive 402 and memory storage device 407, personal computer 400 may similarly be equipped with any suitably arranged memory storage device, or plurality thereof.

Although personal computer 400 is utilized to illustrate a single embodiment of a processing system, the principles of the present invention may be implemented within any processing system having at least one processing unit and a means for receiving speech input data, including, for example, sophisticated calculators and hand held, mini, main frame and super computers, including RISC and parallel processing architectures, as well as within processing system network combinations of the foregoing.

One aspect of the illustrative processing system embodiment is that unknown speech utterances need not be received and recognized coincidentally. Storage devices, such as floppy disks, for example, may be used to enable continuous speech data to be received and processed at or after recordation.

Figure 5:
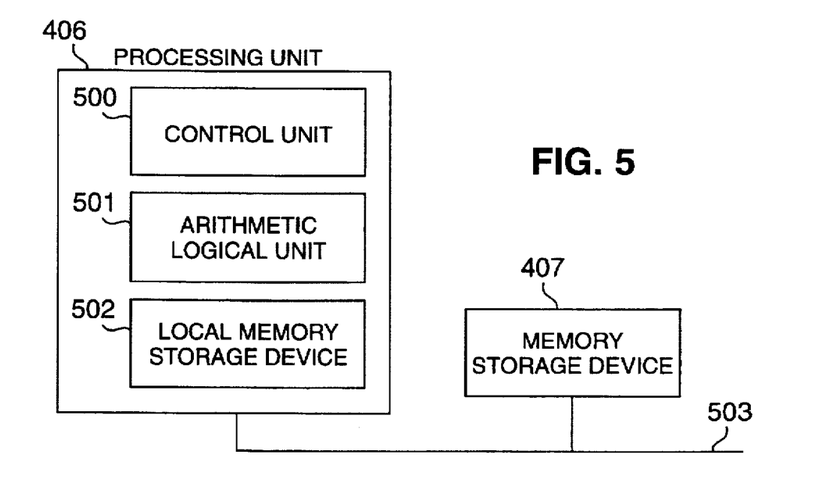
FIG. 5 illustrates a block diagram of one microprocessing system which may be utilized in conjunction with the illustrative processing system of FIG. 4.

FIG. 5 illustrates a block diagram of an illustrative microprocessing system, including a processing unit and a memory storage device, which may be utilized in conjunction with personal computer 400. The microprocessing system includes a single processing unit 406 coupled via data bus 503 with a single memory storage device 407, such as the RAM illustrated in FIG. 4, for example. Memory storage device 407 is operable to store one or more instructions which processing unit 406 is operable to retrieve, interpret and execute. Processing unit 406 includes a control unit 500, an arithmetic logic unit ("ALU") 501, and a local memory storage device 502, such as, for example, stackable cache or a plurality of registers. Control unit 500 is operable to fetch instructions from memory storage device 407. ALU 501 is operable to perform a plurality of operations, including addition and Boolean AND needed to carry out instructions. Local memory storage device 502 is operable to provide local high speed storage used for storing temporary results and control information.

Figure 6:
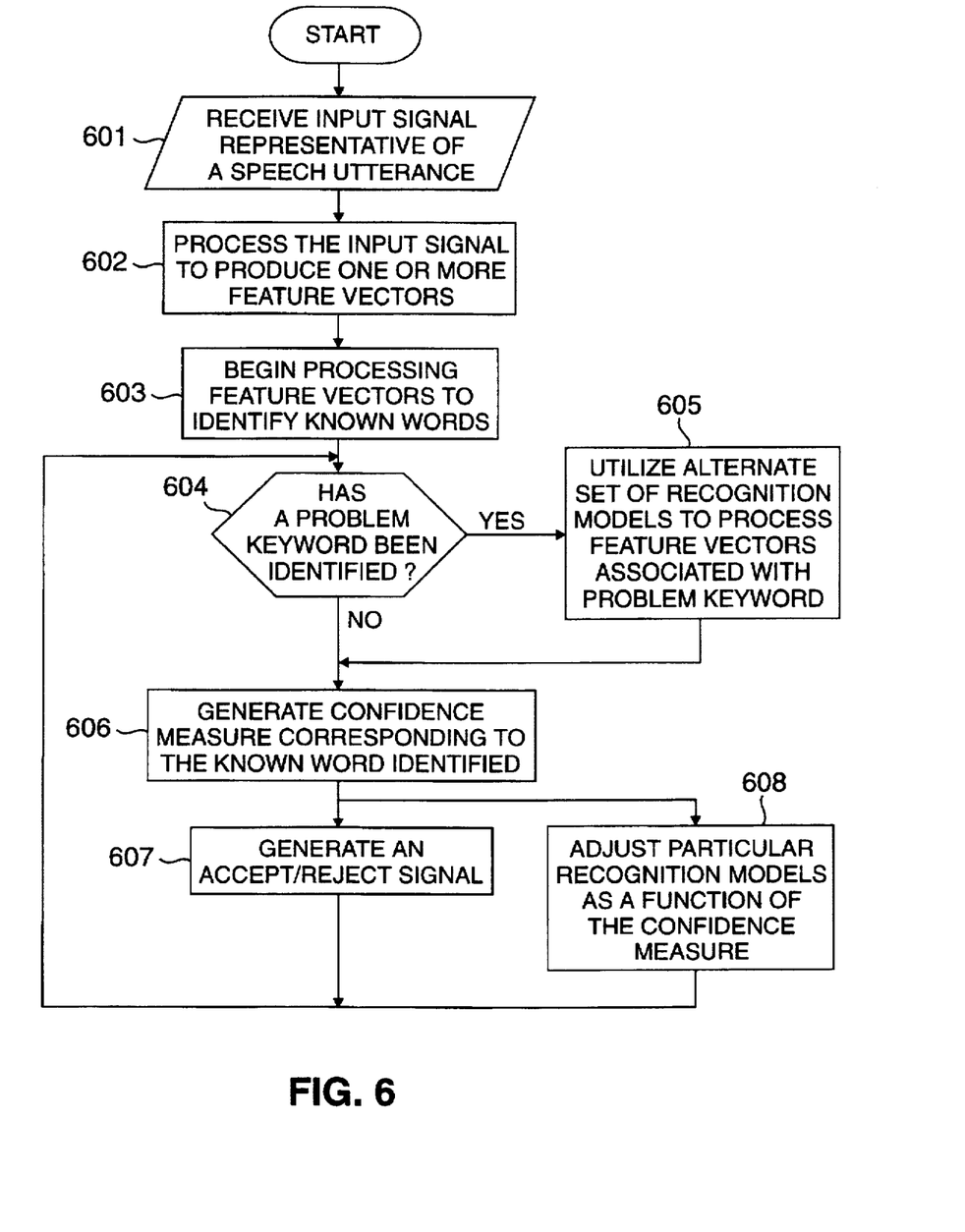
FIG. 6 illustrates a flow diagram of one preferred method for adjusting recognition model parameters to improve the recognition confidence in hypothesized words.

FIG. 6 illustrates a flow diagram of one preferred method for adjusting recognition model parameters to improve the recognition confidence in hypothesized words. The exemplary process begins upon receipt of an input signal representative of a speech utterance, input/output block 601. The received input signal is processed to produce one or more feature vectors, processing block 602. The feature vectors are used to characterize the received input signal. As previously discussed, the speech utterance may be known or unknown depending upon whether the exemplary process is being performed during the preferred training or recognition modes, respectively.

One or more known words within the received input signal are identified utilizing particular ones of a plurality of recognition models, processing block 603. Each one of the recognition models preferably represents a particular known word within a vocabulary. The recognition models preferably utilize HMMs.

In one preferred embodiment, discriminative techniques are employed. The recognition models are divided into at least two sets. A first set representing one or more keywords, and a second set representing one or more alternate hypotheses. As previously discussed, all the feature vectors may be processed near simultaneously utilizing both the first and second recognition model sets. Preferably, however, the feature vectors are processed utilizing the first set of recognition models. Upon the identification, or possible identification, of a particular keyword, such as, for example, a keyword that might present problems for the recognizer, decisional block 604, the associated feature vectors are processed utilizing the second set of recognition models, processing block 605. This second preferred implementation reduces processing resource requirements.

An output signal is generated for each hypothesized, or identified, known word, processing block 606. Each output signal represents a confidence measure corresponding to the relative accuracy of each hypothesis.

An identification, or indicator, signal is preferably produced accepting or rejecting the identified known word, processing block 607. In the embodiment utilizing discriminative techniques, a determination is made as to whether each particular known word is a keyword, or one or more phonetically similar words.

One or more of the associated recognition models are adjusted as a function of the output signal to improve the confidence measure, processing block 608, as previously discussed. In accordance with the discriminative embodiment, a log of the probability that the known word is a keyword is subtracted from a log of the probability that the known word is a phonetically similar word. The resultant difference is utilized to compute an error measure, as previously discussed, which is used to adjust particular recognition model parameters.

Although the present invention and its advantages have been described in detail, it should be understood that various changes, substitutions and alterations can be made herein without departing from the spirit and scope of the invention.

We claim:

1. A speech recognition system comprising:
   a memory for storing a plurality of recognition models wherein each one of said recognition models represents a known word within a vocabulary, said plurality of recognition models including keyword recognition models representing keywords and alternate hypothesis recognition models representing words phonetically similar to the keywords; and
   a processor having an input for receiving an input signal representing a speech utterance, the processor processing said input signal utilizing ones of said plurality of recognition models to identify a particular known word represented within said input signal, generating an output signal representing a confidence measure corresponding to the relative accuracy of the identity of said particular known word, and adjusting at least one of said alternate hypothesis recognition models as a function of said output signal to improve said confidence measure.

2. The system as set forth in claim 1 wherein said memory further operates to store a plurality of processing unit instructions.

3. The system as set forth in claim 2 wherein said processor includes one or more processing units and is further operable to retrieve and execute selected ones of said processing unit instructions, said selected ones of said processing unit instructions directing said processor to process said input signal utilizing ones of said plurality of recognition models.

4. The system as set forth in claim 1 wherein said processor utilizes discriminative techniques and wherein said processor further produces an indicator signal indicating that said particular known word is one of a particular keyword and a particular phonetically similar word.

5. The system as set forth in claim 4 wherein said processor subtracts a measure of the probability that said particular known word is a keyword from a measure of the probability that said particular known word is a word phonetically similar to a keyword.

6. The system as set forth in claim 1 wherein said memory includes a keyword recognition model database and an alternate hypothesis recognition model database.

7. The system as set forth in claim 1 wherein said processor is operable during at least one of a training mode and a recognition mode.

8. The system as set forth in claim 1 wherein said processor is further operative to produce one or more feature vectors characterizing said received input signal.

9. The system as set forth in claim 1 wherein said input signal is representative of an unknown speech utterance.

10. The system as set forth in claim 9 wherein said processor is further operable to produce an indicator signal having one of a first state indicating said confidence measure associated with said particular known word corresponds to particular threshold, and a second state indicating said confidence measure associated with said particular known word does not correspond to said particular threshold.

11. The system as set forth in claim 1 wherein said plurality of recognition models includes one or more Hidden Markov Models.

12. A method for improving the accuracy of a speech recognition system, said speech recognition system utilizing a plurality of recognition models to identify a particular known word within a received input signal, said received input signal representative of a speech utterance, each one of said recognition models representing different known words within a vocabulary, said plurality of recognition models including keyword recognition models representing keywords and alternate hypothesis recognition models representing words phonetically similar to the keywords, said method comprising the steps of:

identifying said particular known word utilizing ones of said plurality of recognition models;

generating an output signal representing a confidence measure corresponding to the relative accuracy of said identification step; and adjusting at least one of said alternate hypotheses recognition models as a function of said output signal to improve said confidence measure.

13. The method as set forth in claim 12 wherein said identification step further includes the step of utilizing discriminative techniques.

14. The method as set forth in claim 13 further including the step of indicating whether said particular known word is one of a particular keyword and a particular phonetically similar word.

15. The method as set forth in claim 14 wherein said adjusting step further includes the step of subtracting a measure of the probability that said particular known word is a keyword from a measure of the probability that said particular known word is a word phonetically similar to a keyword.

16. The method as set forth in claim 13 further including the step of storing said keyword recognition models in a keyword recognition model database and said alternate hypothesis recognition models in an alternate hypothesis recognition model database.

17. The method as set forth in claim 12 wherein said method operates during at least one of a training mode and a recognition mode.

18. The method as set forth in claim 12 wherein said identification step is preceded by the step of producing one or more feature vectors characterizing said received input signal.

19. The method as set forth in claim 12 wherein said input signal is representative of an unknown speech utterance, and said method further includes the step of producing an indicator signal having one of a first state indicating said confidence measure associated with said particular known word corresponds to a particular threshold, and a second state indicating said confidence measure associated with said particular known word does not correspond to said particular threshold.

20. The method as set forth in claim 12 wherein said plurality of recognition models includes one or more Markov Hidden Models.

21. A storage medium for storing a plurality of processing system instructions, said plurality of processing system instructions capable of being read and executed by one or more processing units for performing speech recognition, said memory storage device including:

a first instruction set for storing a plurality of recognition models wherein each one of said recognition models represents a different known word within a vocabulary, said plurality of recognition models including keyword recognition models representing keywords and alternate hypothesis recognition models representing words phonetically similar to the keywords;

a second instruction set for storing a received input signal representing a speech utterance;

a third instruction set for utilizing ones of said plurality of recognition models to identify a particular known word represented within said input signal, generating an output signal representing a confidence measure corresponding to the relative accuracy of the identity of said particular known word, and adjusting at least one of said alternate hypothesis recognition models as a function of said output signal to improve said confidence measure.

22. The storage medium as set forth in claim 21 wherein said storage medium is selected from the group consisting of:

a magnetic device operable to utilize patterns of magnetism to store said processing system instructions, a semiconductor chip operable to utilize on-off static electric charges to store said processing system instructions, and an optical memory operable to utilize on-off light beams to store said processing system instructions.

23. The storage medium as set forth in claim 21 wherein said third instruction set further utilizes discriminative techniques.

24. The storage medium as set forth in claim 23 wherein said first instruction set stores said keyword recognition models to a keyword recognition model database and said alternate hypothesis recognition models to an alternate hypothesis recognition model database.

25. The storage medium as set forth in claim 23 wherein said third instruction set further indicates whether said particular known word is one of a particular keyword and a particular phonetically similar word.

26. The storage medium as set forth in claim 25 wherein said third instruction set subtracts a measure of the probability that said particular known word is a keyword from a measure of the probability that said particular known word is a word phonetically similar to a keyword.

27. The storage medium as set forth in claim 21 wherein said third instruction set is operable during at least one of a training mode and a recognition mode.

28. The storage medium as set forth in claim 21 wherein said second instruction set produces one or more feature vectors characterizing said received input signal.

29. The storage medium as set forth in claim 21 wherein said input signal is representative of an unknown speech utterance, and said third instruction set produces an indicator signal having one of a first state indicating said confidence measure associated with said particular known word corresponds to a particular threshold, and a second state indicating said confidence measure associated with said particular known word does not correspond to said particular threshold.

30. The storage medium as set forth in claim 21 wherein said plurality of recognition models include one or more Markov Hidden Models.

* * * * *